US007523784B2

(12) United States Patent (10) Patent No.: US 7,523,784 B2
Lewis et al. (45) Date of Patent: Apr. 28, 2009

(54) METHOD OF USING HUMIC ACID GRAFTED FLUID LOSS CONTROL ADDITIVES IN CEMENTING OPERATIONS

(75) Inventors: Sam Lewis, Duncan, OK (US); Jiten Chatterji, Duncan, OK (US); Bobby King, Duncan, OK (US); D. Chad Brenneis, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/652,215

(22) Filed: Jan. 11, 2007

(65) Prior Publication Data

US 2008/0169101 A1 Jul. 17, 2008

(51) Int. Cl.
  *E21B 33/13* (2006.01)
(52) U.S. Cl. ...................................... 166/283; 166/294
(58) Field of Classification Search ........................ None
  See application file for complete search history.

(56) References Cited

U.S. PATENT DOCUMENTS

| | | | |
|---|---|---|---|
| 2,805,719 A | 9/1957 | Anderson |
| 4,515,635 A | 5/1985 | Rao et al. |
| 4,555,269 A | 11/1985 | Rao et al. |
| 4,557,763 A | 12/1985 | George et al. |
| 4,640,942 A | 2/1987 | Brothers |
| 4,676,317 A | 6/1987 | Fry et al. |
| 4,700,780 A | 10/1987 | Brothers |
| 4,703,801 A | 11/1987 | Fry et al. |
| 4,818,288 A | 4/1989 | Aignesberger et al. |
| 4,938,803 A | 7/1990 | Huddleston |
| 4,941,536 A | 7/1990 | Brothers et al. |
| 5,028,271 A | 7/1991 | Huddleston |
| 5,049,288 A | 9/1991 | Brothers et al. |
| 5,134,215 A | 7/1992 | Huddleston et al. |
| 5,147,964 A | 9/1992 | Huddleston et al. |
| 5,149,370 A | 9/1992 | Olaussen et al. |
| 5,339,903 A | 8/1994 | Eoff et al. |
| 5,472,051 A | 12/1995 | Brothers |
| 5,705,599 A | 1/1998 | Felixberger et al. |
| 6,085,840 A | 7/2000 | Laramay et al. |
| 6,089,318 A | 7/2000 | Laramay et al. |
| 6,138,759 A | 10/2000 | Chatterji et al. |
| 6,268,406 B1 | 7/2001 | Chatterji et al. |
| 6,270,565 B1 | 8/2001 | Heathman |
| 6,395,853 B1 | 5/2002 | Oswald et al. |
| 6,405,801 B1 | 6/2002 | Vijn et al. |
| 6,497,283 B1 | 12/2002 | Eoff et al. |
| 6,562,122 B2 | 5/2003 | Dao et al. |
| 6,565,645 B1 | 5/2003 | Klein et al. |
| 6,715,552 B2 | 4/2004 | Eoff et al. |
| 6,743,288 B2 | 6/2004 | Eoff et al. |
| 6,767,867 B2 | 7/2004 | Chatterji et al. |
| 6,770,604 B2 | 8/2004 | Reddy et al. |
| 6,776,237 B2 | 8/2004 | Dao et al. |
| 6,822,061 B2 | 11/2004 | Eoff et al. |
| 6,953,090 B2 | 10/2005 | Vijn et al. |
| 6,964,302 B2 | 11/2005 | Luke et al. |
| 7,021,380 B2 | 4/2006 | Caveny |
| 7,073,585 B2 | 7/2006 | Morgan et al. |
| 7,077,203 B1 | 7/2006 | Roddy et al. |
| 7,114,569 B2 | 10/2006 | Chatterji et al. |
| 7,128,148 B2 | 10/2006 | Eoff et al. |
| 7,199,086 B1 * | 4/2007 | Roddy et al. ................. 507/269 |
| 7,360,598 B1 | 4/2008 | Lewis et al. |
| 7,388,045 B1 | 6/2008 | Lewis et al. |
| 2003/0083204 A1 | 5/2003 | Chatterji et al. |
| 2003/0181542 A1 | 9/2003 | Vijn et al. |
| 2003/0230407 A1 | 12/2003 | Vijn et al. |
| 2004/0005987 A1 | 1/2004 | Ristol et al. |
| 2004/0262001 A1 | 12/2004 | Caveny et al. |
| 2005/0034864 A1 | 2/2005 | Caveny et al. |
| 2005/0038127 A1 | 2/2005 | Vijn et al. |
| 2005/0061750 A1 | 3/2005 | Fabri et al. |
| 2005/0121194 A1 | 6/2005 | Morgan et al. |
| 2005/0124503 A1 | 6/2005 | Morgan et al. |
| 2005/0204962 A1 | 9/2005 | Luke et al. |
| 2008/0171806 A1 | 7/2008 | Lewis et al. |

FOREIGN PATENT DOCUMENTS

EP 0 072 445 A2 2/1983

OTHER PUBLICATIONS

Cementing Halad®-413 Fluid-Loss Additive Paper, Halliburton Fluid Systems, #H01503, Jan. 2006.
The Merck Index, An Encyclopedia of Chemicals, Drugs, and Biologicals, 11th Edition, 1989, p. 751.
"Cementing CFR-3 Cement Friction Reducer" HO1325 Oct. 2005, Halliburton Communications.
"Halad-413 Fluid Loss Additive" HO1332 1998, Halliburton Communications.
"HR-5 Cement Additive" HO1335 1998, Halliburton Communications.
"HR-12 Cement Retarder" HO1476 1999, Halliburton Communications.
"Cementing HR-25 Cement Retarder" HO1479 May 2006, Halliburton Communications.
"MicroBond HT Cement Additive" HO1464 1999, Halliburton Communications.
"MicroBond M Cement Additive" HO1463 1999, Halliburton Communications.

(Continued)

*Primary Examiner*—Zakiya W. Bates
(74) *Attorney, Agent, or Firm*—Craig W. Roddy; Tumey, L.L.P.

(57) ABSTRACT

Exemplary embodiments of the cement compositions comprise water, a cement, and a fluid loss control additive, the fluid loss control additive comprising a graft copolymer. The graft copolymer comprises a backbone and at least four grafted monomers selected from the group consisting of 2-acrylamido-2-methylpropanesulfonic acid, acrylamide, acrylic acid, vinylphosphonic acid, diallyldimethylammonium chloride, and salts thereof. The backbone of the graft copolymer comprises a humic acid salt. Methods of cementing using exemplary embodiments of the cement compositions are also provided.

20 Claims, No Drawings

OTHER PUBLICATIONS

"Cementing SCR-100 Cement Retarder" HO1480 May 2006, Halliburton Communications.

"Silicalite Cement Additive" HO1484 1999, Halliburton Communications.

"SSA-1 Strength-Stabilizing Agent" HO1340 1998, Halliburton Communications.

U.S. Appl. No. 11/652,346, filed Jan. 11, 2007 "Cement Compositions Comprising Humic Acid Grafted Fluid Loss Control Additives" by Sam Lewis, et al.

2005 Borregaard LignoTech found at http://www.lignotech.com/eway/default.aspx?pid=249
&trg=MainPage__9490=9721:25010::0:9720:16:::0:0.

Office Action dated Oct. 10, 2007 for U.S. Appl. No. 11/702,324.

Office Action dated Aug. 17, 2007 for U.S. Appl. No. 11/702,342.

Halliburton brochure entitled "Fluid Loss Additive, Halad-413" dated Jan. 2006.

Halliburton brochure entitled: "Fluid Loss Additives, Our Case for Halliburton Additives is Water Tight" dated 1994.

SPE, PE 10623, Crylamide/Acrylic Acid Copolymers for Cement Fluid Loss, Copyright 1982, American Institute of Mining, Metallurgical and Petroleum Engineers, Inc.; SPE Sixth International Symposium on Oilfield and Geothermal Chemistry, Dallas, Texas, Jan. 25-27, 1982.

SPE 28984, Comparative Laboratory Selection and Field Testing of Polymers for Selective Control of Water Production in Gas Wells, Copyright 1995, Society of Petroleum Engineers, Inc.; SPE International Symposium on Oilfield Chemistry held in San Antonio, Texas, Feb. 14-17, 1995.

SPE/IADC 21976, Synthetic Retarder for High-Strength Cement, Copyright 1991, SPE/IADC Drilling Conference; 1991 SPE/IADC Drilling Conference held in Amsterdam, Mar. 11-14, 1991.

SPE 18901, New Fluid-Loss Additives for Oilfield Cementing, Copyright 1989, Society of Petroleum Engineers, Inc.; SPE Production Operations Symposium help in Oklahoma City, Oklahoma, Mar. 13-14, 1989.

Office Action Mailed Dec. 12, 2008 in U.S. Appl. No. 11/652,346.

International Search Report and Written Opinion dated Jun. 30, 2008 for PCT/GB2008/000067.

* cited by examiner

METHOD OF USING HUMIC ACID GRAFTED FLUID LOSS CONTROL ADDITIVES IN CEMENTING OPERATIONS

CROSS-REFERENCE TO RELATED APPLICATIONS

This application is related to U.S. patent application Ser. No. 11/652,346, entitled "Cement Compositions Comprising Humic Acid Grafted Fluid Loss Control Additives," filed on the same date herewith, the entire disclosure of which is incorporated herein by reference.

BACKGROUND

The present invention relates to cementing operations. More particularly, the present invention relates to the use of a graft copolymer as a fluid loss control additive in cementing operations, the graft copolymer comprising a backbone of a humic acid salt and at least four grafted monomers selected from the group consisting of 2-acrylamido-2-methylpropanesulfonic acid, acrylamide, acrylic acid, vinylphosphonic acid, diallyldimethylammonium chloride, and salts thereof.

Well cement compositions are commonly utilized in subterranean operations, particularly subterranean well construction and remedial operations. For example, in subterranean well construction, a pipe string (e.g., casing and liners) may be run into a well bore and cemented in place. The process of cementing the pipe string in place is commonly referred to as "primary cementing." In a typical primary cementing operation, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in plugging and abandonment operations and remedial cementing operations, such as squeeze cementing and the placement of cement plugs.

For such subterranean cementing operations to be successful, the cement compositions typically include a fluid loss control additive to reduce the loss of fluid, from the cement compositions, e.g., when they contact permeable subterranean formations and zones. Excessive fluid loss may cause, inter alia, a cement composition to become prematurely dehydrated, which limits the amount of the cement composition that can be pumped. Due to this premature dehydration, excessive pump pressure may be required to place the cement composition, potentially resulting in breakdown of the formation and/or destabilization of the well bore.

Certain polymers have been used heretofore as fluid loss control additives in cementing operations. For example, cellulosic materials such as hydroxyethyl cellulose and carboxymethylhydroxyethyl cellulose have been used as fluid loss control additives. Copolymers of 2-acrylamido-2-methylpropanesulfonic acid and acrylamide or N,N-dimethylacrylamide have also been used as fluid loss control additives. In addition, graft copolymers comprising a backbone of lignin or lignite and pendant groups comprising at least one member selected from the group consisting of 2-acrylamido-2-methylpropanesulfonic acid, acrylonitrile, and N,N-dimethylacrylamide have been used as fluid loss control additives. These fluid loss control additives, however, may not provide a desired level of fluid loss control at high temperatures (e.g., at least about 500° F. (260° C.)) and/or may be exhibit undesirable properties (e.g., dispersive).

SUMMARY

The present invention relates to cementing operations. More particularly, the present invention relates to the use of a graft copolymer as a fluid loss control additive in cementing operations, the graft copolymer comprising backbone of a humic acid salt and at least four grafted monomers selected from the group consisting of 2-acrylamido-2-methylpropanesulfonic acid, acrylamide, acrylic acid, vinylphosphonic acid, diallyldimethylammonium chloride, and salts thereof.

An exemplary embodiment of the present invention provides a method of cementing in a subterranean formation. The method of cementing comprises introducing a cement composition into a subterranean formation. The cement composition comprises water, a cement, and a fluid loss control additive, the fluid loss control additive comprising a graft copolymer. The graft copolymer comprises a backbone and at least four grafted monomers selected from the group consisting of 2-acrylamido-2-methylpropanesulfonic acid, acrylamide, acrylic acid, vinylphosphonic acid, diallyldimethylammonium chloride, and salts thereof. The backbone of the graft copolymer comprises a humic acid salt.

Another exemplary embodiment of the present invention provides a method of cementing in a subterranean formation. The method of cementing comprises introducing a cement composition into a space between a pipe string and a subterranean formation. The cement composition comprises water, a cement, and a fluid loss control additive, the fluid loss control additive comprising a graft copolymer. The graft copolymer comprises a backbone and at least four grafted monomers selected from the group consisting of 2-acrylamido-2-methylpropanesulfonic acid, acrylamide, acrylic acid, vinylphosphonic acid, diallyldimethylammonium chloride, and salts thereof. The backbone of the graft copolymer comprises a humic acid salt. The method further comprises allowing the cement composition to set in the space between the pipe string and the subterranean formation.

DESCRIPTION OF SPECIFIC EMBODIMENTS

The present invention relates to cementing operations. More particularly, the present invention relates to the use of a graft copolymer as a fluid loss control additive in cementing operations, the graft copolymer comprising a backbone of a humic acid salt and at least four grafted monomers selected from the group consisting of 2-acrylamido-2-methylpropanesulfonic acid (AMPS® acid), acrylamide, acrylic acid, vinylphosphonic acid (VPA), diallyldimethylammonium chloride (DADMAC), and salts thereof. While these graft copolymers are effective at reducing fluid loss from cement compositions in a variety of cementing applications, they should be particularly useful for reducing fluid loss in high temperature applications, for example, in wells having a bottom hole circulating temperature (BHCT) of at least about 500° F. (260° C.).

An exemplary embodiment of the cement compositions of the present invention comprises water, cement, and a fluid loss control additive comprising a graft copolymer, the graft copolymer comprising a backbone of a humic acid salt and at least four grafted monomers selected from the group consisting of AMPS® acid, acrylamide, acrylic acid, VPA, DADMAC, and salts thereof. Those of ordinary skill in the art will appreciate that the exemplary cement compositions generally should have a density suitable for a particular application. By way of example, exemplary embodiments of the cement compositions may have a density in the range of from about 8 pounds per gallon ("ppg") to about 21 ppg.

The water used in exemplary embodiments of the cement compositions of the present invention may be freshwater or saltwater (e.g., water containing one or more salts dissolved therein, seawater, brines, saturated saltwater, etc.). Generally, the water may be from any source, provided that it does not contain an excess of compounds that undesirably affect the cement composition. In general, the water may be present in an amount sufficient to form a pumpable slurry. In exemplary embodiments, the water may be present in the cement compositions in an amount in the range of from about 33% to about 200% by weight of the cement ("bwoc"). In exemplary embodiments, the water may be present in an amount in the range of from about 35% to about 70% bwoc.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen, and/or sulfur, which set and harden by reaction with water. Such hydraulic cements, include, but are not limited to, Portland cements, pozzolana cements, gypsum cements, high alumina content cements, slag cements, and silica cements, and combinations thereof. In certain embodiments, the hydraulic cement may comprise a Portland cement. In some embodiments, the Portland cements that are suited for use in exemplary embodiments of the present invention are classified as Class A, C, H, and G cements according to American Petroleum Institute, *API Specification for Materials and Testing for Well Cements,* API Specification 10, Fifth Ed., Jul. 1, 1990.

In addition, exemplary embodiments of the cement compositions of the present invention comprise a fluid loss control additive. As previously mentioned, such fluid loss control additives comprise a graft copolymer that comprises a backbone of a humic acid salt, wherein the humic acid salt is grafted with at least four monomers selected from the group consisting of AMPS® acid, acrylamide, acrylic acid, VPA, DADMAC, and salts thereof. In general, these graft copolymers are effective at reducing fluid loss from cement compositions in a variety of cementing operations. By way of example, these graft copolymers are particularly suitable for use as fluid loss control additives in high temperature applications, for example, in wells with a BHCT of at least about 500° F. (260° C.).

Generally, the backbone of the graft copolymer comprises a humic acid salt. In general, humic acids are compounds that may result from the decomposition of organic matter. By way of example, humic acid may comprise allomelanins found in soils, coals, and peat, resulting from the decomposition of organic matter, such as dead plants. In addition, in exemplary embodiments, the backbone may further comprise polyvinyl alcohol, polyethylene oxide, polypropylene oxide, polyethyleneimine, and combinations thereof. Those of ordinary skill in the art will appreciate that the humic acid may be treated with a caustic (for example, potassium hydroxide, sodium hydroxide, or ammonium hydroxide) to solubilize the humic acid in water. By way of example, treatment of the humic acid with a caustic solution generally may dissolve or disperse a portion of the humic acid into the solution. Such solution may then be concentrated to increase the humic acid content or may be used directly in the polymerization.

The graft copolymer may comprise a sufficient amount of the humic acid salt backbone to provide a desirable level of fluid loss control. In exemplary embodiments, the backbone may be present in the graft copolymer in an amount in the range of from about 5% to about 95% by weight of the graft copolymer on a dry basis. In exemplary embodiments, the backbone may be present in the graft copolymer in an amount in the range of from about 10% to about 50% by weight of the graft copolymer on a dry basis. In exemplary embodiments, the backbone may be present in the graft copolymer in an amount in the range of from about 10% to about 20% by weight of the graft copolymer on a dry basis.

As previously mentioned, the humic acid salt backbone of the graft copolymer is grafted with at least four monomers selected from the group consisting of AMPS® acid, acrylamide, acrylic acid, VPA, DADMAC, and salts thereof. In general, the grafted monomers are present in pendant groups attached to the humic acid salt backbone in a random nature. By way of example, each pendant group attached to the humic acid salt backbone may contain one or more of the monomers in a random nature. Without being limited by theory, it is believed that the various monomers (e.g., at least four of AMPS® acid, acrylamide, acrylic acid, VPA, and DADMAC) attach at free radicals created in the humic acid salt backbone. In exemplary embodiments, at least four monomers selected from the group consisting of the AMPS® acid, acrylamide, acrylic acid, VPA, DADMAC, and salts thereof may be admixed with the humic acid salt prior to initiation of the polymerization reaction.

Generally, the graft copolymer may comprise a sufficient amount of these grafted monomers to provide a desirable level of fluid loss control. In exemplary embodiments, the grafted monomers may be present in the graft copolymer in an amount in the range of from about 5% to about 95% by weight of the graft copolymer on a dry basis. In exemplary embodiments, the grafted monomers may be present in the graft copolymer in an amount in the range of from about 50% to about 90% by weight of the graft copolymer on a dry basis. In exemplary embodiments, the grafted monomers may be present in the graft copolymer in an amount in the range of from about 80% to about 90% by weight of the graft copolymer on a dry basis.

An exemplary fluid loss control additive comprises a humic acid salt backbone grafted with AMPS® acid salt, acrylamide, acrylic acid salt, and DADMAC. Each of these grafted monomers may be present in the exemplary graft copolymer in a variety of different mole ratios. In an exemplary embodiment, the exemplary graft copolymer may have an AMPS® acid salt-to-acrylamide mole ratio in the range of from about 1:1 to about 4:1. In an exemplary embodiment, the exemplary graft copolymer may have an AMPS® acid salt-to-acrylic acid salt mole ratio in the range of from about 1:1 to about 10:1. In an exemplary embodiment, the exemplary graft copolymer may have an AMPS® acid salt-to-DADMAC mole ratio in the range of from about 1:1 to about 10:1. In an exemplary embodiment, the exemplary graft copolymer may have an AMPS® acid salt-to-acrylamide-to-acrylic acid salt-to-DADMAC mole ratio in the range of from about 4:3:2:1 to about 4:1:0.5:0.1. In another exemplary embodiment, the exemplary graft copolymer may have an AMPS® acid salt-to-acrylamide-to-acrylic acid salt-to-DADMAC mole ratio in the range of from about 4:3:1:1 to about 4:2:1:0.25.

Another exemplary fluid loss control additive comprises a humic acid salt backbone grafted with AMPS® acid salt, acrylamide, VPA salt, DADMAC. Each of these grafted monomers may be present in the exemplary graft copolymer in a variety of different mole ratios. In an exemplary embodiment, the exemplary graft copolymer may have an AMPS® acid salt-to-acrylamide mole ratio in the range of from about 1:1 to about 4:1. In an exemplary embodiment, the exemplary graft copolymer may have an AMPS® acid salt-to-VPA salt mole ratio in the range of from about 2:1 to about 10:1. In an exemplary embodiment, the exemplary graft copolymer may have an AMPS® acid salt-to-DADMAC mole ratio in the range of from about 1:1 to about 10:1. In an exemplary embodiment, the exemplary graft copolymer may have an AMPS® acid salt-to-acrylamide-to-VPA salt-to-DADMAC mole ratio in the range of from about 4:4:1:2 to about 4:1:0.1:0.1. In another exemplary embodiment, the exemplary graft copolymer may have an AMPS® acid salt-to-acrylamide-to-VPA salt-to-DADMAC mole ratio in the range of from about 4:4:1:2 to about 4:2:1:0.25.

Those of ordinary skill in the art will appreciate that the amount of each of the grafted monomers present in the graft copolymer is dependent upon a number of factors, including cost, the temperature of use, the desired molecular weight of the graft copolymer, dispersive properties, and desired amount of fluid loss control.

Those of ordinary skill in the art will appreciate that suitable graft copolymers may be in an acid form or in a salt form. As will be appreciated, a variety of salts of the graft copolymers may be prepared, for example, by neutralizing the acid form of the AMPS® acid, acrylic acid monomer, and/or VPA monomer with an alkaline agent. By way of example, suitable alkaline agents may include sodium hydroxide, ammonium hydroxide or the like. This neutralization may occur, for example, either prior to or after the polymerization of the graft copolymer. By way of example, a salt of AMPS® acid (such as the sodium salt of AMPS® acid) may be used in the polymerization of the graft copolymer. In addition, neutralization of the monomers may occur, for example, due to calcium ions present in the exemplary cement compositions.

The fluid loss control additive should be included in exemplary embodiments of the cement compositions of the present invention in an amount sufficient to provide a desired level of fluid loss control. In exemplary embodiments, the fluid loss control additive may be present in exemplary embodiments of the cement compositions in an amount in the range of from about 0.1% to about 5% bwoc. In exemplary embodiments, the fluid loss control additive may be present in exemplary embodiments of the cement compositions in an amount in the range of from about 0.2% to about 3% bwoc.

Exemplary embodiments of the graft copolymers used as fluid loss control additives in accordance with the present invention may be prepared using any suitable polymerization technique. By way of example, suitable graft copolymers may be prepared using any of a variety of free radical polymerization techniques. The initiators employed in these free radical techniques to produce exemplary embodiments of the graft copolymer may generally comprise a redox initiator capable of generating a free radical in the humic acid which will initiate polymerization by reacting with the monomers. While various ceric salts and other compounds may be suitable to effect the free radical initiation, an ammonium persulfate-sodium bisulfite redox system may be employed for the preparation of exemplary embodiments of the humic acid graft copolymers. In certain embodiments, water may be employed as the solvent in the polymerization reactions. Those of ordinary skill in the art, however, will appreciate that other solvents capable of solubilizing the reactants as desired also may be utilized.

Other additives suitable for use in subterranean cementing operations also may be added to exemplary embodiments of the cement compositions. Examples of such additives include dispersing agents, set retarding agents, accelerants, defoaming agents, lost circulation materials, salts, fly ash, fiber, strength retrogression additives, weighting agents, vitrified shale, lightweight additives (e.g., bentonite, gilsonite, glass spheres, etc.), and combinations thereof. A person having ordinary skill in the art, with the benefit of this disclosure, will readily be able to determine the type and amount of additive useful for a particular application and desired result.

As will be appreciated by those of ordinary skill in the art, exemplary embodiments of the cement compositions of the present invention may be used in a variety of subterranean applications, including primary and remedial cementing. Exemplary embodiments of the cement compositions may be introduced into a subterranean formation and allowed to set therein. Exemplary embodiments of the cement compositions may comprise water, cement, and a fluid loss control additive comprising a graft copolymer, the graft copolymer comprising a humic acid salt backbone and at least four grafted monomers selected from the group consisting of AMPS® acid, acrylamide, acrylic acid, VPA, DADMAC, and salts thereof. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may used, for example, in squeeze cementing operations or in the placement of cement plugs.

To facilitate a better understanding of the present technique, the following examples of some specific exemplary embodiments are given. In no way should the following examples be read to limit, or to define, the scope of the invention.

EXAMPLE 1

Copolymers comprising a humic acid salt backbone grafted with at least four monomers selected from AMPS® acid, acrylamide, acrylic acid, VPA, DADMAC, and salts thereof were prepared in accordance with the following procedure. First, sodium humate, water, a defoamer, and ethylenediaminetetraacetic acid (EDTA) were added to a reactor vessel. To this vessel, a 58% by weight solution of the sodium salt of AMPS® acid, a 48% by weight solution of acrylamide, acrylic acid (or VPA as set forth in the table below), and DADMAC were then added. This mixture was heated and held at a temperature of about 158° F. (70° C.) for one hour while purging with nitrogen. After one hour, ammonium persulfate was added to initiate polymerization. This mixture was held at a temperature of about 158° F. (70° C.) for two hours. After two hours, sodium metabisulfite was added, and the mixture was allowed to cool. When the mixture reached room temperature, a 50% solution of sodium hydroxide was added to adjust the pH in the range of from about 7 to about 8. The weight percent of each component utilized in the copolymer's preparation is listed in the table below.

TABLE 1

| Component | Formulation #1 (% by wt) | Formulation #2 (% by wt) |
|---|---|---|
| Sodium Humate | 4.7 | 4.7 |
| Water | 42.84 | 41.01 |
| NaOH (50% solution) | 1.69 | 1.28 |
| Defoamer | 0.01 | 0.01 |
| NaAMPS (58% solution) | 31.48 | 31.48 |
| Acrylamide (48% solution) | 5.92 | 5.92 |
| Acrylic Acid | 1.44 | — |
| VPA | — | 1.08 |
| DADMAC (62% solution) | 5.22 | 7.82 |
| NaEDTA | 0.1 | 0.1 |
| Ammonium Persulfate (27% solution) | 3.3 | 3.3 |
| Sodium Metabisulfite (27% solution) | 3.3 | 3.3 |

EXAMPLE 2

The following series of tests were performed to compare the performance of exemplary embodiments of the fluid loss control additives of the present invention with HALAD®-413 fluid loss additive, which is described in U.S. Pat. No. 4,676, 317. Accordingly, sample cement compositions were prepared that comprised Portland Class H cement, HR®-12 retarder (0.6% bwoc), a free water control additive (0.1% bwoc), a fluid loss control additive (1%bwoc), and sufficient water to provide a density of 16.4 ppg. HR®-12 retarder is a cement set retarder available from Halliburton Energy Services, Inc. In addition, the free water control additive used was hydroxyethyl cellulose, available from Halliburton Energy Services, Inc.

With respect to the fluid loss control additives, Sample No. 1 included HALAD®-413 fluid additive as the fluid loss control additive. Sample Nos. 2-9 comprised the exemplary embodiments of the fluid loss control additive of the present invention having a humic acid concentration of between 12% to 16% by weight and mole ratios of the grafted monomers as set forth in the table below.

TABLE 2

| | Mole Ratio | | | | |
|---|---|---|---|---|---|
| Polymer | NaAMPS | Acrylamide | Acrylic Acid | VPA | DADMAC |
| Humic Acid Graft Copolymer 1 | 0.4 | 0.2 | 0.1 | — | 0.1 |
| Humic Acid Graft Copolymer 1A | 0.4 | 0.25 | 0.1 | — | 0.05 |
| Humic Acid Graft Copolymer 1B | 0.4 | 0.275 | 0.1 | — | 0.025 |
| Humic Acid Graft Copolymer 1C | 0.3 | 0.375 | 0.1 | — | 0.025 |
| Humic Acid Graft Copolymer 1D | 0.3 | 0.4125 | 0.05 | — | 0.0375 |
| Humic Acid Graft Copolymer 2 | 0.4 | 0.2 | — | 0.05 | 0.15 |
| Humic Acid Graft Copolymer 2A | 0.4 | 0.275 | — | 0.05 | 0.075 |
| Humic Acid Graft Copolymer 2B | 0.4 | 0.3125 | — | 0.05 | 0.375 |

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. Additionally, the rheological properties of the sample cement compositions were also determined using a Fann® Model 35 viscometer at the temperature listed in the table below, in accordance with the above-mentioned APP RP 10B. The results of these tests are given in the table below.

TABLE 3

| Sample No. | Density (ppg) | Fluid Loss Control Additive (1% bwoc) | Temp. (° F.) | Fluid Loss (cc/30 min.) | Rheology Tests: Viscometer Readings | | | | | | | |
|---|---|---|---|---|---|---|---|---|---|---|---|---|
| | | | | | 300 RPM | 200 RPM | 100 RPM | 60 RPM | 30 RPM | 6 RPM | 3 RPM | 600 RPM |
| 1 | 16.4 | HALAD ®-413 | 80 | n/d | 300+ | 300+ | 250 | 172 | 101 | 29 | 16 | 300+ |
| | | | 180 | 30 | 300+ | 232 | 127 | 80 | 43 | 10 | 5 | 300+ |

TABLE 3-continued

| Sample No. | Density (ppg) | Fluid Loss Control Additive (1% bwoc) | Temp. (° F.) | Fluid Loss (cc/30 min.) | Rheology Tests: Viscometer Readings | | | | | | | |
|---|---|---|---|---|---|---|---|---|---|---|---|---|
| | | | | | 300 RPM | 200 RPM | 100 RPM | 60 RPM | 30 RPM | 6 RPM | 3 RPM | 600 RPM |
| 2 | 16.4 | Humic Acid Graft Copolymer 1 | 80 180 | n/d 24 | 300+ 300+ | 300+ 270 | 270 143 | 183 88 | 107 46 | 29 9 | 16 5 | 300+ 300+ |
| 3 | 16.4 | Humic Acid Graft Copolymer 1A | 80 180 | n/d 20 | 300+ 300+ | 300+ 244 | 279 124 | 189 77 | 110 40 | 30 9 | 17 7 | 300+ 300+ |
| 4 | 16.4 | Humic Acid Graft Copolymer 1B | 80 180 | n/d 20 | 300+ 300+ | 300+ 243 | 296 128 | 200 82 | 116 46 | 32 12 | 19 7 | 300+ 300+ |
| 5 | 16.4 | Humic Acid Graft Copolymer 1C | 80 180 | n/d 22 | 300+ 300+ | 300+ 282 | 300+ 153 | 204 95 | 120 52 | 34 12 | 19 7 | 300+ 300+ |
| 6 | 16.4 | Humic Acid Graft Copolymer 1D | 80 180 | n/d 18 | 300+ 300+ | 300+ 250 | 224 129 | 144 78 | 80 40 | 19 9 | 10 4 | 300+ 300+ |
| 7 | 16.4 | Humic Acid Graft Copolymer 2 | 80 180 | n/d 20 | 300+ 300+ | 300+ 300+ | 300+ 268 | 300+ 164 | 241 81 | 63 15 | 32 7 | 300+ 300+ |
| 8 | 16.4 | Humic Acid Graft Copolymer 2A | 80 180 | n/d 19 | 300+ 300+ | 300+ 216 | 239 115 | 157 71 | 89 37 | 23 8 | 13 5 | 300+ 300+ |
| 9 | 16.4 | Humic Acid Graft Copolymer 2B | 80 180 | n/d 19 | 300+ 300+ | 300+ 250 | 239 132 | 162 81 | 93 42 | 24 9 | 14 5 | 300+ 300+ |

Thus, Example 2 indicates, inter alia, that the use of exemplary embodiments of the fluid loss control additives of the present invention provides improved fluid loss control and more desirable rheology as compared to HALAD®-413 fluid loss additive.

EXAMPLE 3

Additional tests were performed to compare the performance of exemplary embodiments of the fluid loss control additives of the present invention with HALAD®-413 fluid loss additive at high temperatures. Accordingly, sample cement compositions were prepared that comprised Portland Class H cement, HR®-12 retarder, a free water control additive, SSA-1 strength stabilizing agent, a fluid loss control additive, and sufficient water to provide a density of 16.4 ppg. The free water control additive used was hydroxyethyl cellulose, available from Halliburton Energy Services, Inc. Sample No. 10 did not include the free water control additive. SSA-1 is a strength stabilizing agent (crystalline silica) available from Halliburton Energy Services, Inc. The specific fluid loss control additive included in each sample is set forth in the table below.

After preparation, fluid loss tests were performed at 1,000 psi and the temperature listed in the table below. For this series of tests, the fluid loss was determined using a stirring fluid loss apparatus rated for testing at temperatures up to 400° F. and pressures up to 2,000 psi. The stirring fluid loss apparatus is described in API RP10B-2/ISO 10426-2 in section 10. For these fluid loss tests, the sample was stirred in the test cell while the temperature was increased to the test temperature. After the sample reached the test temperature, rotation of the paddle inside the cell was stopped, the cell was rotated to place the sample against the filter medium (a 325-mesh sieve), and the fluid loss was determined. The filtrate from the sample flowed into a filtrate collection chamber that had back pressure applied to it in order to keep it from boiling for any tests containing salt. The results of these tests are given in the table below.

TABLE 4

| Sample No. | Density (ppg) | HR® Retarder (% bwoc) | FWCA (% bwoc) | SSA-1 (% bwoc) | Fluid Loss Control Additive (1% bwoc) | Temp. (° F.) | Fluid Loss (cc/30 min.) |
|---|---|---|---|---|---|---|---|
| 10 | 16.4 | 0.6 | — | 35 | Humic Acid Graft Copolymer 2 | 250 | 28 |
| 11 | 16.4 | 1.5 | 0.1 | 35 | Humic Acid Graft Copolymer 2 | 300 | 60 |
| 12 | 16.4 | 1.5 | 0.1 | 35 | Humic Acid Graft Copolymer 1B | 350 | 44 |

TABLE 4-continued

| Sample No. | Density (ppg) | HR® Retarder (% bwoc) | FWCA (% bwoc) | SSA-1 (% bwoc) | Fluid Loss Control Additive (1% bwoc) | Temp. (° F.) | Fluid Loss (cc/30 min.) |
|---|---|---|---|---|---|---|---|
| 13 | 16.4 | 1.5 | 0.1 | 35 | Humic Acid Graft Copolymer 2B | 350 | 32 |
| 14 | 16.4 | 2 | 0.1 | 35 | HALAD ®-413 | 400 | 82 |
| 15 | 16.4 | 2 | 0.1 | 35 | Humic Acid Graft Copolymer 1B | 400 | 68 |
| 16 | 16.4 | 2 | 0.1 | 35 | Humic Acid Graft Copolymer 1C | 400 | 96 |
| 17 | 16.4 | 2 | 0.1 | 35 | Humic Acid Graft Copolymer 1D | 400 | 94 |
| 18 | 16.4 | 2 | 0.1 | 35 | Humic Acid Graft Copolymer 2B | 400 | 68 |

Thus, Example 3 indicates, inter alia, that the use of exemplary embodiments of the fluid loss control additives of the present invention may provide improved fluid loss control as to HALAD®-413 fluid loss additive.

EXAMPLE 4

Additional tests were performed to evaluate the performance of exemplary embodiments of the fluid loss control additives of the present invention. Accordingly, sample cement compositions were prepared that comprised Portland Class G cement, SSA-1 strength stabilizing agent (35% bwoc), HR®-5 retarder (0.3% bwoc), Microbond™ expanding additive (0.1% bwoc), a fluid loss control additive (1% bwoc), Silicalite® cement additive (10% bwoc), bentonite (2% bwoc), and sufficient water to provide a density of 15.2 ppg. HR®-5 retarder is a cement set retarder available from Halliburton Energy Services, Inc. Microbond™ expanding additive is a cement additive available from Halliburton Energy Services, Inc. Silicalite® cement additive is a finely divided, high surface area amorphous silica available from Halliburton Energy Services, Inc. The specific fluid loss control additive included in each sample is set forth in the table below.

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. Additionally, the rheological properties of the sample cement compositions were also determined using a Fann® Model 35 viscometer at the temperature listed in the table below, in accordance with the above-mentioned APP RP 10B. The results of these tests are given in the table below.

Thus, Example 4 indicates, inter alia, that the use of exemplary embodiments of the fluid loss control additives of the present invention may provide desirable fluid loss control and rheology.

EXAMPLE 5

Additional tests were performed to evaluate the performance of exemplary embodiments of the fluid loss control additives of the present invention. Accordingly, sample cement compositions were prepared that comprised Portland Class H cement, SSA-1 strength stabilizing agent (35% bwoc), SCR®-100 retarder (0.75% bwoc), CFR™-3 cement dispersant (0.75% bwoc), HR®-25 retarder (0.1% bwoc), a fluid loss control additive (1% bwoc), and sufficient water to provide a density of 17.5. HR®-25 retarder is a cement set retarder available from Halliburton Energy Services, Inc. SCR®-100 retarder is a cement set retarder available from Halliburton Energy Services, Inc. CFR™-3 cement dispersant is a cement dispersant available from Halliburton Energy Services, Inc. The specific fluid loss control additive included in each sample is set forth in the table below.

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. The results of these tests are given in the table below.

TABLE 5

| Sample No. | Density (ppg) | Fluid-Loss-Control Additive (1% bwoc) | Temp. (° F.) | Fluid Loss (cc/30 min.) | Rheology Tests: Viscometer Readings | | | | | | | |
|---|---|---|---|---|---|---|---|---|---|---|---|---|
| | | | | | 300 RPM | 200 RPM | 100 RPM | 60 RPM | 30 RPM | 6 RPM | 3 RPM | 600 RPM |
| 19 | 15.2 | Humic Acid Graft Copolymer 1B | 80 | n/d | 154 | 115 | 67 | 46 | 29 | 10 | 7 | 263 |
| | | | 180 | 62 | 160 | 117 | 70 | 48 | 30 | 12 | 9 | 215 |
| 20 | 15.2 | Humic Acid Graft Copolymer 2B | 80 | n/d | 132 | 94 | 51 | 33 | 18 | 5 | 3 | 227 |
| | | | 180 | 44 | 135 | 84 | 46 | 30 | 18 | 6 | 4 | 180 |

TABLE 6

| Sample No. | Density (ppg) | Fluid Loss Control Additive (1% bwoc) | Temp. (° F.) | Howco Consistometer Reading | | Fluid Loss (cc/30 min.) |
|---|---|---|---|---|---|---|
| | | | | 0 min | 20 min | |
| 21 | 17.5 | HALAD ®-413 | 180 | 18 | 14 | 100 |
| 22 | 17.5 | Humic Acid Graft Copolymer 2B | 180 | 17 | 13 | 58 |

Thus, Example 5 indicates, inter alia, that the use of exemplary embodiments of the fluid loss control additives of the present invention provides improved fluid loss control as compared to HALAD®-413 fluid loss additive.

EXAMPLE 6

Compressive strength and thickening time tests were performed to compare the performance of sample cement compositions that comprised exemplary embodiments of the fluid loss control additives of the present invention with HALAD®-413 fluid loss additive. Accordingly, sample cement compositions were prepared that comprised Portland Class H cement, SSA-1 strength stabilizing agent (35% bwoc), a free water control additive (0.1% bwoc), HR®-12 retarder, a fluid loss control additive (1% bwoc), and sufficient water to provide a density of 16.4 ppg. The free water control additive used was hydroxyethyl cellulose, available from Halliburton Energy Services, Inc. The specific fluid loss control additive included in each sample is set forth in the table below.

After preparation, the sample cement compositions were subjected to 48-hour compressive strength tests and thickening time tests at the temperature listed in the table below, in accordance with API RP10B, Recommended Practices for Testing Well Cements. The results of these tests are set forth in the table below.

TABLE 7

| Sample No. | Density (ppg) | Fluid Loss Control Additive (1% bwoc) | Temp. (° F.) | Thickening Time to 70 BC (Hr:Min) | Comp. Strength (psi) |
|---|---|---|---|---|---|
| 23 | 16.4 | HALAD ®-413 | 250 | 6:46 | 3,963 |
| 24 | 16.4 | Humic Acid Graft Copolymer 1B | 250 | 5:56 | 4,050 |
| 25 | 16.4 | Humic Acid Graft Copolymer 2B | 250 | 9:46 | 4,505 |
| 26 | 16.4 | HALAD ®-413 | 325 | 4:46 | n/d |
| 27 | 16.4 | Humic Acid Graft Copolymer 1B | 325 | 3:42 | n/d |
| 28 | 16.4 | Humic Acid Graft Copolymer 2B | 325 | 3:46 | n/d |

Thus, Example 6 indicates, inter alia, that the use of exemplary embodiments of the fluid loss control additives of the present invention may provide desirable thickening times and compressive strengths.

Therefore, the present invention is well adapted to attain the ends and advantages mentioned as well as those that are inherent therein. The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents, and alternatives falling within the scope and spirit of the present invention as defined by the following appended claims.

What is claimed is:

1. A method of cementing in a subterranean formation comprising:
    introducing a cement composition into a subterranean formation, the cement composition comprising:
        water;
        a cement; and
        a fluid loss control additive comprising a graft copolymer, the graft copolymer comprising a backbone, a first grafted monomer comprising at least one monomer selected from the group consisting of 2-acrylamido-2-methylpropansulfonic acid and salts thereof, a second grafted monomer comprising acrylamide, a third grafted monomer comprising at least one monomer selected from the group consisting of acrylic acid, vinylphosphonic acid, and salts thereof, and a fourth grafted monomer comprising diallyldimethylammonium chloride, the backbone comprising a humic acid salt.

2. The method of claim 1, wherein the water is present in an amount in the range of from about 35% to about 70% by weight of the cement.

3. The method of claim 1, wherein the water is selected from the group consisting of freshwater and saltwater.

4. The method of claim 1, wherein the cement comprises a hydraulic cement.

5. The method of claim 1, wherein the cement comprises a hydraulic cement selected from the group consisting of a Portland cement, a pozzolana cement, a gypsum cement, a high alumina content cement, a slag cement, a silica cement, and combinations thereof.

6. The method of claim 1, wherein the graft copolymer comprises the backbone in an amount in the range of from about 10% to about 50% by weight of the graft copolymer on a dry basis, and wherein the graft copolymer comprises the grafted monomers in an amount in the range of from about 50% to about 90% by weight of the graft copolymer on a dry basis.

7. The method of claim 1, wherein the backbone comprises a monomer selected from the group consisting of polyvinyl alcohol, polyethylene oxide, polypropylene oxide, polyethyleneimine, and combinations thereof.

8. The method of claim 1, wherein the third grafted monomer comprises the acrylic acid or the salt thereof.

9. The method of claim 8, wherein the graft copolymer has a first grafted monomer to second grafted monomer to third grafted monomer to fourth grafted monomer mole ratio in the range of from about 4:3:2:1 to about 4:1:0.5:0.1.

10. The method of claim 1, wherein wherein the third grafted monomer comprises the vinylphosphonic acid or the salt thereof.

11. The method of claim 10, wherein the graft copolymer has a first grafted monomer to second grafted monomer to third grafted monomer to fourth grafted monomer mole ratio in the range of from about 4:4:1:2 to about 4:1:0.1:0.1.

12. The method of claim 1, wherein the fluid loss control additive is present in the cement composition in an amount in the range of from about 0.1% to about 5% bwoc.

13. The method of claim 1, wherein introducing the cement composition into the subterranean formation comprises introducing the cement composition into a well bore having a bottom hole circulating temperature of at least about 500° F.

14. The method of claim 1, comprising allowing the cement composition to set in the subterranean formation.

15. A method of cementing in a subterranean formation comprising:
   introducing a cement composition into a space between a pipe string and a subterranean formation, the cement composition comprising:
      water;
      a cement; and
      a fluid loss control additive comprising a graft copolymer, the graft copolymer comprising a backbone, a first grafted monomer comprising at least one monomer selected from the group consisting of 2-acrylamido-2-methylpropansulfonic acid and salts thereof, a second grafted monomer comprising acrylamide, a third grafted monomer comprising at least one monomer selected from the group consisting of acrylic acid, vinylphosphonic acid, and salts thereof, and a fourth grafted monomer comprising diallyldimethylanmmonium chloride; and
   allowing the cement composition to set in the space between the pipe string and the subterranean formation.

16. The method of claim 15, wherein the graft copolymer comprises the backbone in an amount in the range of from about 10% to about 50% by weight of the graft copolymer on a dry basis, and wherein the graft copolymer comprises the grafted monomers in an amount in the range of from about 50% to about 90% by weight of the graft copolymer on a dry basis.

17. The method of claim 15, wherein the third grafted monomer comprises the acrylic acid or the salt thereof and wherein the graft copolymer comprises the grafted monomers in a first grafted monomer to second grafted monomer to third grafted monomer to fourth grafted monomer mole ratio in the range of from about 4:3:2:1 to about 4:1:0.5:0.1.

18. The method of claim 15, wherein the third grafted monomer comprises the vinylphosphonic acid or the salt thereof and wherein the graft copolymer comprises the grafted monomers in a first grafted monomer to second grafted monomer to third grafted monomer to fourth grafted monomer mole ratio in the range of from about 4:4:1:2 to about 4:1:0.1:0.1.

19. The method of claim 15, wherein introducing a cement composition into a space between a pipe string and a subterranean formation comprises introducing the cement composition into a well bore having a bottom hole circulating temperature of at least about 500° F.

20. The method of claim 15, comprising running the pipe string into a well bore penetrating the subterranean formation.

* * * * *